S. MILLS.
Churn.

No. 78,812.

Patented June 9, 1868.

United States Patent Office.

SAMUEL MILLS, OF CLINTON, ILLINOIS.

Letters Patent No. 78,812, dated June 9, 1868.

IMPROVEMENT IN CHURN.

*The Schedule referred to in these Letters Patent and making part of the same.*

TO ALL WHOM IT MAY CONCERN:

Be it known that I, SAMUEL MILLS, of Clinton, in the county of De Witt, and in the State of Illinois, have invented new and useful Improvements in Churns; and I do hereby declare that the following is a full, clear, and exact description thereof, reference being had to the accompanying drawings, and to the letters of reference marked thereon.

Figure 1 is an end elevation of my churn,
Figure 2 is a side elevation, and
Figure 3 is a vertical section of the box, and an elevation of the dasher.

The ends of the churn-box are isosceles-triangular in shape, and are connected by rectangular sides, which meet at the apex of the long angles, the other angle constituting the bottom of the box, which is open. A is the end of the box, and B the side. A portion of one side of the box is cut away, and the opening covered with a wire gauze or perforated metallic plate, C, as shown in fig. 2. Triangular notches, $a$, are cut in the bottom of the box, as shown in fig. 1, or, in lieu thereof, holes may be made through the ends of the box, near the bottom.

At the apex of the box a slot is cut from end to end, through which the dasher-blade is inserted. $b$ is the blade of the dasher, which is perforated, as shown in fig. 3, and $c$ is the handle thereof. On the handle, at the junction of the blade, are shoulders, which rest on each side of the slot. The fulcrum of the dasher is on a pin, $d$, which passes through the blade parallel with its broadest surface, and through the ends of the churn. On each side of the dasher, just over the top of the box, are secured flaps $e$, which are equal in length to the entire width of the box, and extend down a short distance over the sides of the box. The blade of the dasher is nearly equal to the perpendicular of the box. The box may be made with a rectangular opening, covered with a perforated plate or wire gauze in one or both sides, or it may be made without any openings whatever in the sides, the dasher only being perforated; or there may be reticulated or perforated work in one or both sides, without perforations in the dasher.

In using the churn, the box is set in a pail or other vessel containing the milk or cream, and a reciprocating lateral motion given to the dasher, which will force the milk through the reticulated work or perforated plate B, and through the perforations in the blade $b$. The partial vacuum produced in the box by the action of the dasher is supplied through the notches $a$, or their equivalent. During the process of churning, the flaps $d$ will prevent the milk, which will sometimes be forced out through the slot at the top of the box, being thrown over the top of the vessel in which the churn is placed.

Having thus described my invention, what I claim as new, and desire to secure by Letters Patent, is—

1. The box A B, constructed as described and used while partially submerged in the cream, in combination with the wire gauze or perforated plate C.

2. The dasher $b$ $c$, provided with flaps $e$ $e$, in combination with the box A B, substantially as and for the purpose set forth.

In testimony that I claim the above-described improvements in churns, I have hereunto signed my name, this 28th day of February, 1868.

SAMUEL MILLS.

Witnesses:
   W. L. CHAMBERS,
   JOHN J. McGRAW.